United States Patent [19]

Namba

[11] Patent Number: 5,261,268
[45] Date of Patent: Nov. 16, 1993

[54] GAS LEAK DETECTION SYSTEM

[75] Inventor: Mitsuo Namba, Machida, Japan

[73] Assignee: Agency of Industrial Science & Technology, Ministry of International Trade & Industry, Tokyo, Japan

[21] Appl. No.: 851,284

[22] Filed: Mar. 12, 1992

[30] Foreign Application Priority Data

Mar. 14, 1991 [JP] Japan .................... 3-073759

[51] Int. Cl.$^5$ ........................... G01M 3/26
[52] U.S. Cl. ....................... 73/40.5 R; 340/605
[58] Field of Search ............ 73/40.5 R; 340/605, 340/632

[56] References Cited

U.S. PATENT DOCUMENTS

| | | | |
|---|---|---|---|
| 3,624,627 | 11/1971 | Evans | 73/40.5 R X |
| 4,205,702 | 6/1980 | Silverwater | 137/557 |
| 4,518,955 | 5/1985 | Meyer | 340/605 |
| 4,776,206 | 10/1988 | Armstrong et al. | 73/40 |
| 4,916,437 | 4/1990 | Gazzaz | 73/40.5 R X |
| 4,942,758 | 7/1990 | Cofield | 73/49.2 |
| 5,072,621 | 12/1991 | Hasselmann | 73/40.5 R |

FOREIGN PATENT DOCUMENTS

| | | | |
|---|---|---|---|
| 0011329 | 5/1980 | European Pat. Off. | |
| 85239 | 6/1980 | Japan | 73/40.5 R |
| 88634 | 5/1983 | Japan | 73/40.5 R |

OTHER PUBLICATIONS

Patent Abstracts of Japan, vol. 12, No. 373, (C-534) [3220], Oct. 6, 1988, & JP-A-63-125610, May 28, 1988, M. Seki, et al., "Method For Controlling Automatic Bottom Blowing With Electric ARC Furnace".

Patent Abstracts Of Japan, vol. 1, No. 31, Mar. 29, 1977, & JP-A-51-124986, Oct. 30, 1976, N. Iwasaki, et al., "Leak Detector In a Closed Pipe Line".

*Primary Examiner*—Tom Noland
*Assistant Examiner*—Joseph W. Roskos
*Attorney, Agent, or Firm*—Oblon, Spivak, McClelland, Maier & Neustadt

[57] ABSTRACT

A gas leak detection system comprises a flow sensor for detecting the amount of gas flowing through a gas flow passage, a flow signal generator for producing a flow signal representing the quantity of gas flow detected by the flow sensor, a pressure sensor installed in the gas flow passage at a point upstream of the flow sensor for detecting the gas pressure in the gas flow passage, a pressure signal generator for producing a pressure signal representing fluctuations in the pressure detected by the pressure sensor and a computing device electrically connected with the flow signal generator and the pressure signal generator. When it is found that no flow signal is being produced, the pressure fluctuation is compared with a prescribed pressure fluctuation range and a leak signal is produced when the pressure fluctuation value falls within the prescribed range.

4 Claims, 10 Drawing Sheets

GAS LEAK DETECTION SYSTEM

BACKGROUND OF THE INVENTION

1. Field of the Invention

This invention relates to a gas leak detection system for detecting leakage of gas from a gas supply path at points upstream of a gas meter.

2. Prior Art Statement

Recent years have seen a rise in the number of gas explosions occurring as a result of gas leaking from gas supply pipes. Underground gas pipes are apt to develop leaks owing to corrosion of the pipes, cracking as a result of uneven ground settlement and other causes. The risk of leakage is particularly high at hospitals, schools and the like, where gas is frequently supplied to the point of use from a remote storage facility through an underground pipe.

The method most commonly used for detecting leaks in such a gas supply path requires the installation of a pressure sensor in the gas supply path beforehand and involves periodic inspections conducted at regular intervals—annually or biennially, for example. The inspection is conducted by closing both ends of the supply path, raising the pressure inside the path to a prescribed level of, say 850 mm $H_2O$, and monitoring for pressure decrease, which, if found, indicates a leak.

Another method used is to continuously monitor the gas flow in the gas supply pipe using a flow meter. The detection of an abnormally large gas flow, i.e. a gas flow greater than the maximum expectable during ordinary gas consumption, indicates that a leak has occurred.

The former method involving periodic inspections is not generally capable of detecting leaks at an early stage because, for example, a leak arising shortly after the completion of one inspection will not be discovered until the next. If this should happen, or if a leak present at the time of inspection was too small to detect, a dangerously large amount of gas is apt to accumulate before the time of the next inspection. In addition, there is also a danger of the amount of leakage increasing with the passage of time owing to progressive corrosion of the pipe. In either case the risk of an explosion increases.

The latter method using a flow sensor to monitor the flow of gas through the pipe has a shortcoming in that the flow meter does not respond to leaks occurring upstream of the position at which it is installed. Though able to detect downstream leaks, it cannot detect those occurring upstream of the flow meter.

As already mentioned, at hospitals, schools and the like, the gas storage facility is frequently located far from the gas using equipment and the two sites are connected by an underground gas pipe. In such cases, the flow sensor is generally installed at the gas using end, either in a gas meter or on a wall of the building in which the gas using equipment is located. Since the flow meter is unable to detect a flow change limited to an upstream region of the gas supply path, there is a high possibility of it being impossible to detect a leak occurring in the underground gas pipe.

An object of this invention is to provide a gas leak detection system capable of simply and reliably detecting leakage of gas from the gas supply path at points upstream of a gas meter.

SUMMARY OF THE INVENTION

For achieving this object, the present invention provides a gas leak detection system comprising a flow sensor for detecting the amount of gas flowing through a gas flow passage to be monitored for leakage, a flow signal generator for producing a flow signal representing the quantity of gas flow detected by the flow sensor, a pressure sensor installed in the gas flow passage at a point upstream of the flow sensor for detecting the gas pressure in the gas flow passage, a pressure signal generator for producing a pressure signal representing fluctuations in the pressure detected by the pressure sensor and computing means electrically connected with the flow signal generator and the pressure signal generator, the computing means having a flow signal discrimination means for discriminating whether or not a flow signal is being produced by the flow signal generator, a pressure signal discrimination means for discriminating fluctuation in the pressure signal from the pressure signal generator, and a leak discrimination means which in response to a discrimination by the flow signal discrimination means that no flow signal is being produced compares the pressure fluctuation discriminated by the pressure signal discrimination means with a prescribed pressure fluctuation range and produces a leak signal when the pressure fluctuation value falls within the prescribed range.

The flow sensor monitors the gas flow in the gas flow passage and when it detects gas flow, the flow signal generator sends a flow signal to the computing means. The pressure sensor monitors the pressure fluctuation in the gas flow passage upstream of the gas meter and when it detects a pressure fluctuation, the pressure signal generator sends a pressure signal to the computing means.

The computing means discriminates whether or not a flow signal is being produced by the flow signal discrimination means and the pressure signal discrimination means discriminates the fluctuation in the pressure signal.

When the flow signal discrimination means discriminates that no flow signal is being produced, the leak discrimination means compares the pressure fluctuation discriminated by the pressure signal discrimination means with a prescribed pressure fluctuation range and if it finds that the pressure fluctuation value falls within the prescribed range, it produces a leak signal.

As explained in the foregoing, in the present invention the gas flow passage and the gas pressure are independently detected and a gas leak signal is produced when the pressure fluctuation value falls within the prescribed range irrespective of the fact that no gas flow signal is being produced. With this arrangement, gas leaks can be detected immediately and reliably, with substantially no possibility of a misoperation.

The above and other features of the present invention will become apparent from the following description made with reference to the drawings.

DETAILED DESCRIPTION OF THE PREFERRED EMBODIMENT

Figure 1:
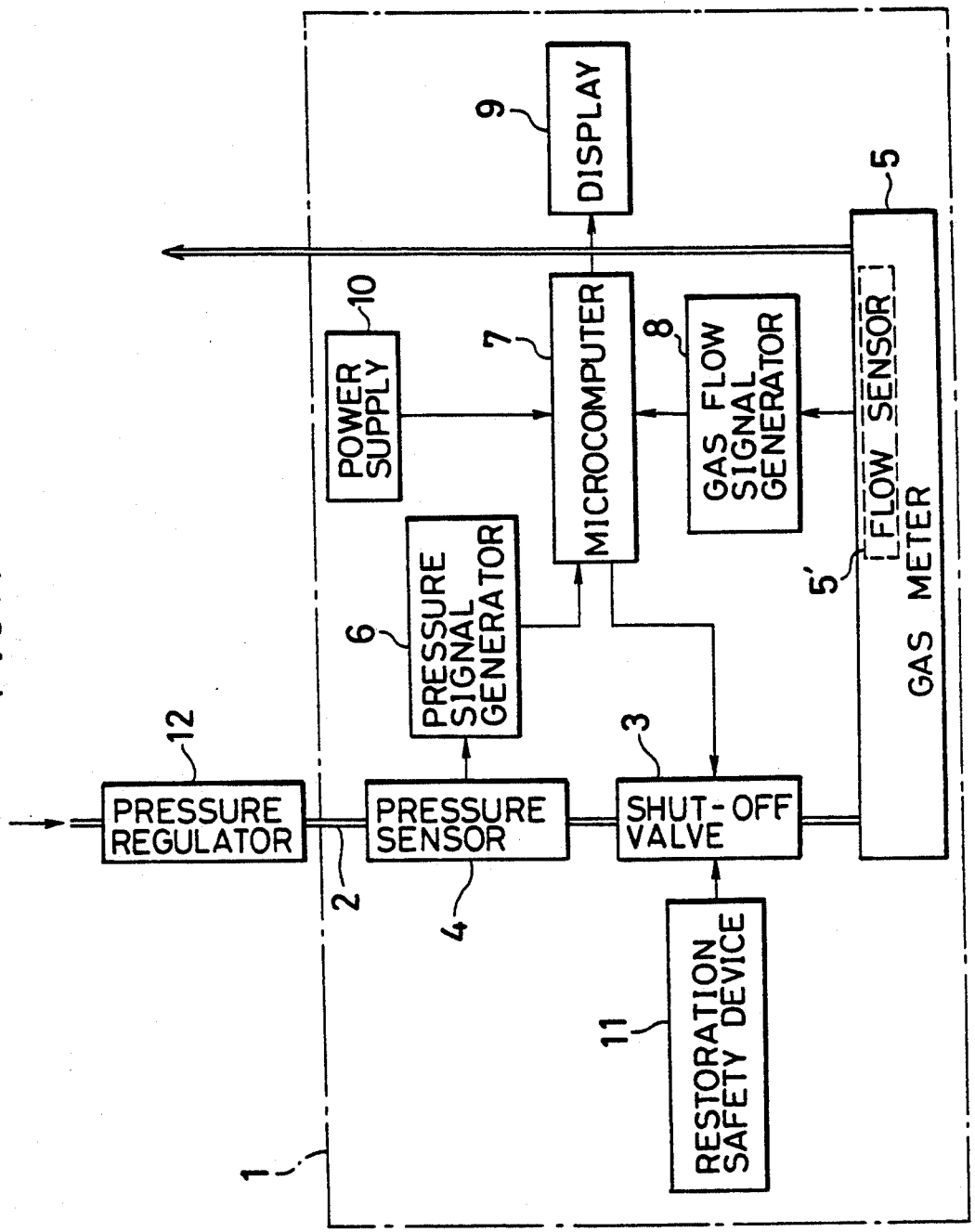
FIG. 1 is a block diagram of the gas leak detection system of the present invention.

FIG. 1 is a block diagram of an embodiment of the gas leak detection system according to the invention.

This gas leak detection system, designated generally by reference numeral 1, includes a pressure sensor 4 installed upstream of a gas meter 5 near the downstream end of a gas flow passage 2. It is generally preferable for the pressure sensor 4 to be installed near the gas meter 5. A shut-off valve 3 is installed in the vicinity the pressure sensor 4. The pressure sensor 4 is electrically connected via a pressure signal generator 6 with a microcomputer 7 serving as a computing means. The gas meter 5 is normally installed near the gas using equipment and is equipped with a flow sensor 5' for detecting the amount of gas flowing through the gas flow passage 2. The gas meter 5, specifically its flow sensor 5' is electrically connected with the microcomputer 7 via a gas flow signal generator 8. The microcomputer 7 is also electrically connected with a display 9 for displaying warnings and/or information concerning system problems and with the shut-off valve 3 for shutting-off the upstream side of the gas flow passage 2. The shut-off valve 3 is electrically connected with a restoration safety device 11 for restoring it to its initial state after it has once operated and the safety of the gas supply system has been confirmed. The system also has a power supply 10 for supplying electric power to the system components.

Figure 2:
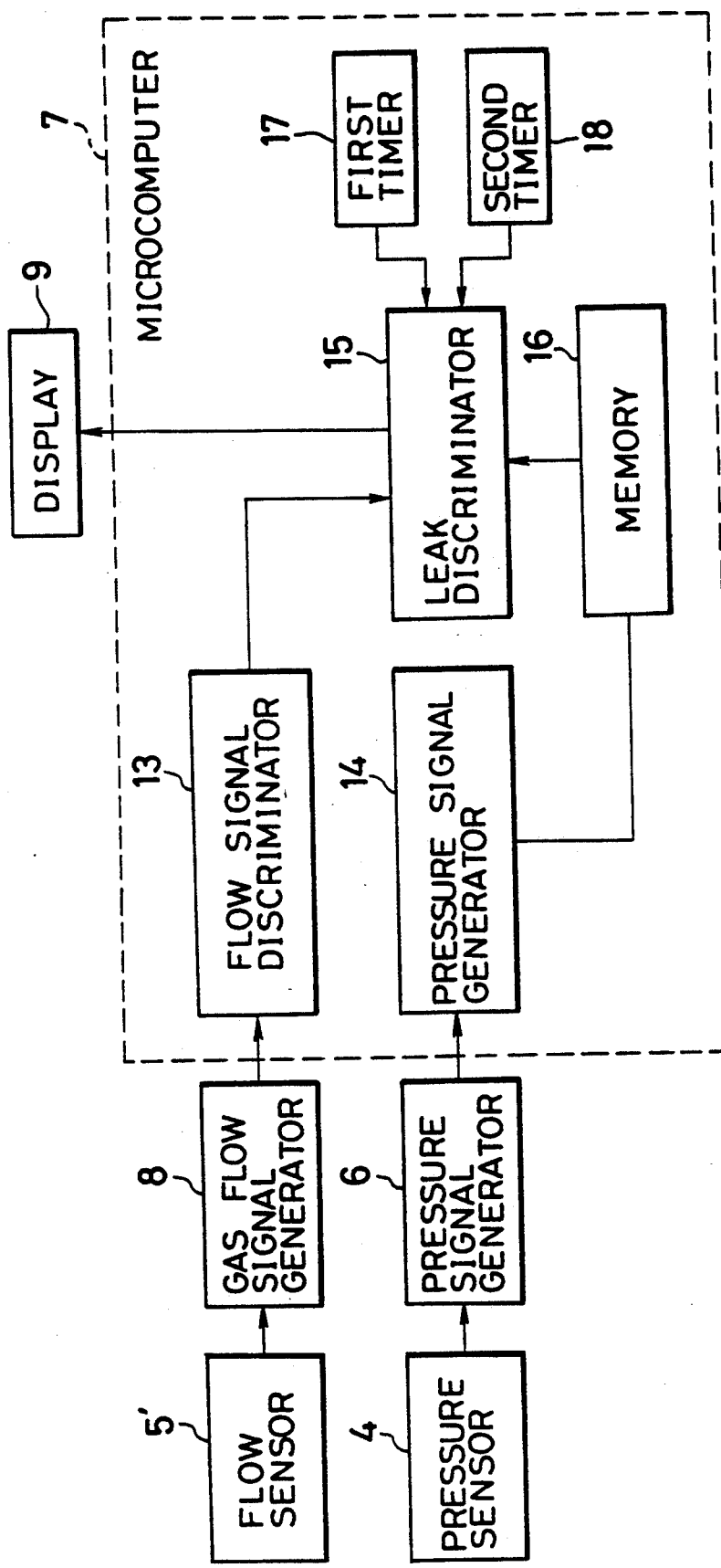
FIG. 2 is a block diagram of a microcomputer constituting the computing means of the gas leak detection system of FIG. 1.

As shown in the example configuration of FIG. 2, the microcomputer 7 has a flow signal discriminator 13 for discriminating whether or not a flow signal is being produced by the gas flow signal generator 8, a pressure signal discriminator 14 for discriminating fluctuation of the pressure signal from the pressure signal generator 6, a leak discriminator 15 for producing a leak signal when it finds that the pressure fluctuation value falls within the prescribed range, a memory 16 for storing, inter alia, the result of the discrimination by the pressure signal discriminator 14, a first timer 17 for setting the processing start time and a second timer 18 for setting the length of the monitoring period.

The pressure signal generator 6 amplifies the signal received from the pressure sensor 4, filters the result to extract only the effective signal component therefrom, shapes the waveform of the extracted component with a waveform shaper, converts the result into a pulse signal and outputs the pulse signal as a pressure fluctuation signal.

The gas flow signal generator 8 produces one pulse for each revolution of the flow meter of the gas meter 5 and thus serves to convert the mechanical motion of the flow meter into an electric signal. Specifically, in the case where the gas flow signal generator 8 is used in conjunction with a diaphragm type gas meter, it is constituted of a diaphragm which is reciprocated by the gas flow, a magnet linked with the diaphragm so as to be rotated by the reciprocating motion thereof, and a reed switch which detects the rotation of the magnet and is repeatedly turned on and off thereby. As the magnet rotates at a speed proportional to the gas flow, the reed switch turns on and off at a rate proportional to the rotation. Thus for each reciprocation of the diaphragm, i.e. for each revolution of the magnet, the gas flow signal generator 8 produces one flow signal pulse.

A pressure regulator 12 is provided in the gas flow passage 2 at a point between the gas supply source (not shown) and the gas leak detection system 1 for maintaining the pressure of the gas in the gas flow passage 2 constant. In the case of liquid propane (LP) gas supplied from cylinders, for example, the pressure inside the cylinder is required to be between 0.7 and 15.6 $Kg/cm^2$ (in Japan), and for the gas to burn properly in a gas appliance this has to be adjusted to a gas pressure of 200–300 mm $H_2O$. The pressure regulator 12 is therefore connected with the outlet of the gas cylinder for regulating the pressure in the gas flow passage 2.

Figure 3:
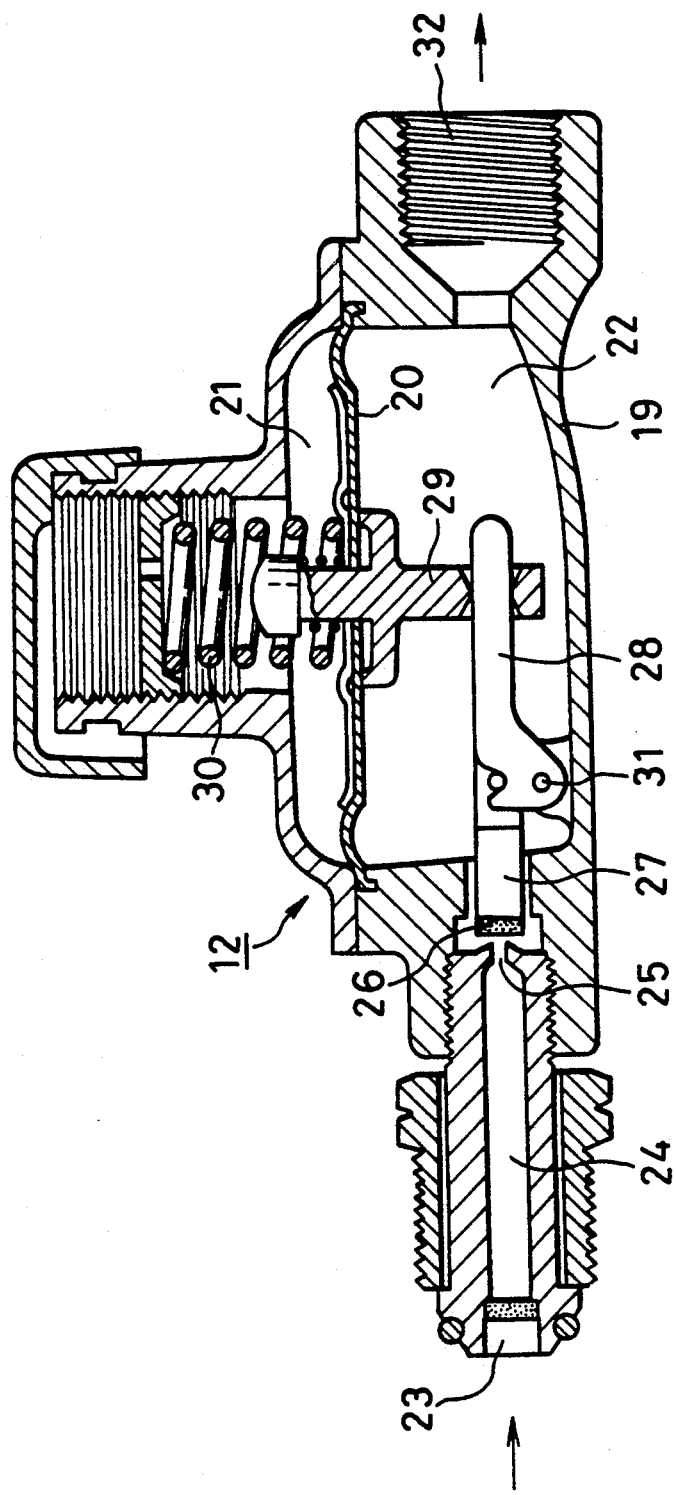
FIG. 3 is a sectional view of an example of a gas regulator.

An example of such a pressure regulator is illustrated in FIG. 3. This is a single stage pressure regulator having a casing 19 divided by a diaphragm 20 into an air chamber 21 above and a pressure reduction chamber 22 below. A nozzle 24 having an inlet 23 and an nozzle orifice 25 is attached to the inlet side of the pressure reduction chamber 22 and a valve rod 27 having a valve member 26 is disposed to face the nozzle orifice 25. The valve rod 27 is connected through a lever 28 with an operating member 29 attached to the diaphragm 20. The diaphragm 20 is energized downward, i.e. in the direction of the pressure reduction chamber 22, by a spring disposed in the air chamber 21.

High-pressure gas entering the inlet 23 passes through the nozzle 24 into the pressure reduction chamber 22. As the pressure in the pressure reduction chamber 22 increases owing to the gas inflow, the diaphragm 20 is pushed up toward the air chamber 21 side against the force of the spring 30. As a result, the operating member 29 attached to the diaphragm 20 rises, causing the lever 28 connected with the operating member 29 to rotate around a shaft, which in turn causes the valve rod 27 to move toward the inlet 23 side. The nozzle orifice 25 of the nozzle 24 is thus throttled (or completely closed if the pressure is particularly high) by the valve member 26. On the other hand, the pressure in the pressure reduction chamber 22 falls as the gas therein flows out through the outlet 32 so that the diaphragm 20 is pressed down toward the pressure reduction chamber 22 side by the force of the spring 30. This causes the lever 28 connected with the operating member 29 to rotate about the shaft 31 in the direction causing the valve rod 27 to move toward the outlet 32 side and, therefore, the valve member 26 moves away from the nozzle orifice 25 of the nozzle 24 and the inflow of high-pressure gas increases.

Thus the rising and falling of the diaphragm 20 with fluctuation of the pressure in the pressure reduction chamber 22 adjusts the amount of gas entering from the nozzle 24 such that the pressure of the gas flowing into the gas flow passage 2 is maintained approximately constant. The pressure in the gas flow passage 2 therefore remains substantially the same when gas is flowing out of it, either to operate a gas appliance in the normal manner or owing to a gas leak.

When gas is not flowing in the gas flow passage 2, however, the pressure of the gas in the pipe (the pipe pressure) varies with the outdoor temperature (more precisely with the gas temperature which varies with the outdoor temperature). Specifically, a 1° C. change in the gas temperature causes a 37 mm $H_2O$ change in the gas pressure. This is because the gas expands and contracts as the outdoor temperature rises and falls. The fluctuation in pipe pressure is particularly pronounced during the daytime if even a part of the pipe is exposed to sunlight.

On most days the temperature will vary by at least 10° C. Say, for example, that the regulated pressure of the gas is 280 mm $H_2O$ on a morning when the outdoor temperature is 5° C. Then if the temperature rises to 15° C. during the day, the gas pressure will become about 650 mm $H_2O$ (280+37×10).

FIGS. 4 to 9 show examples of the fluctuation in pipe pressure with change in outdoor temperature measured in tests conducted by the inventor.

Figure 5:
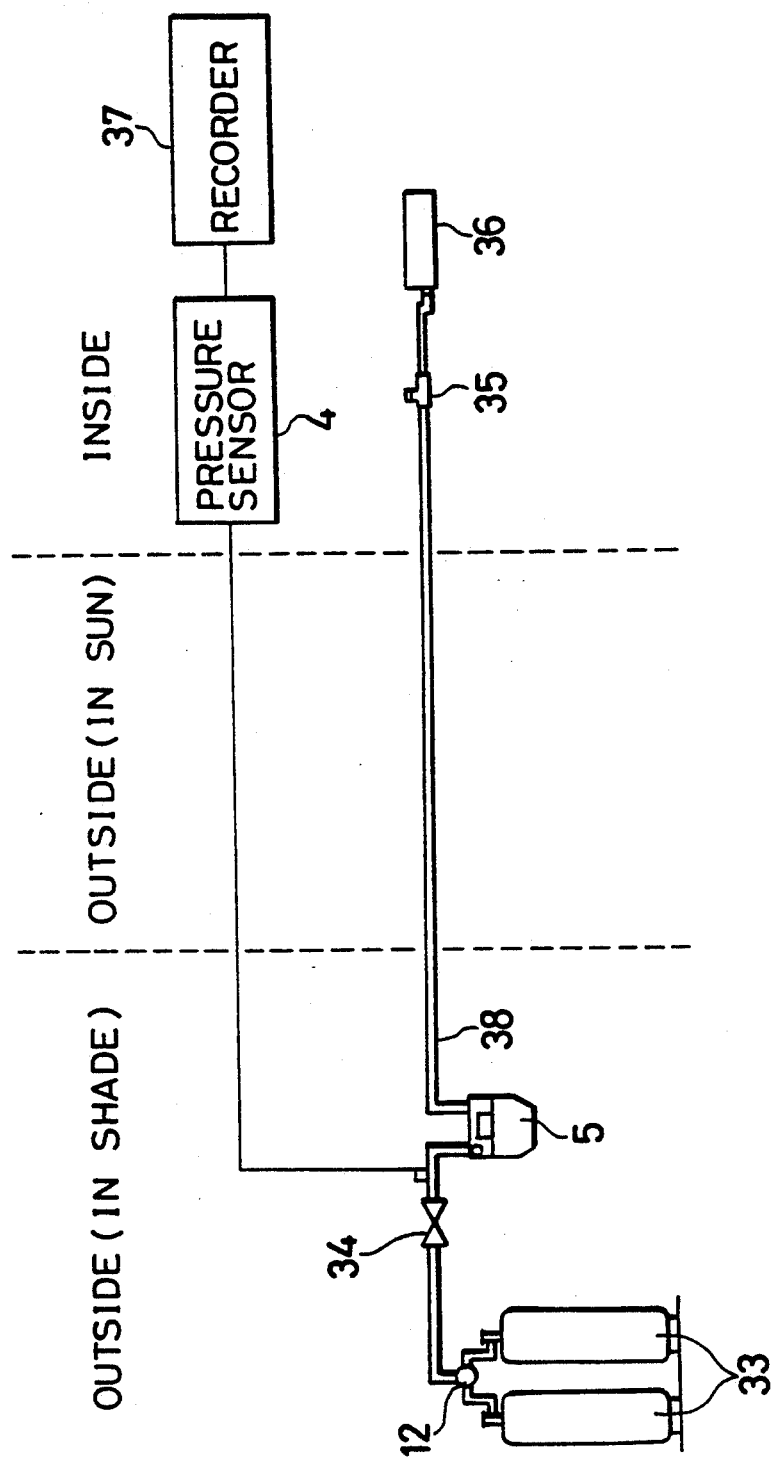
FIG. 5 is a schematic view of a gas supply system using two gas cylinders.
Figure 6:
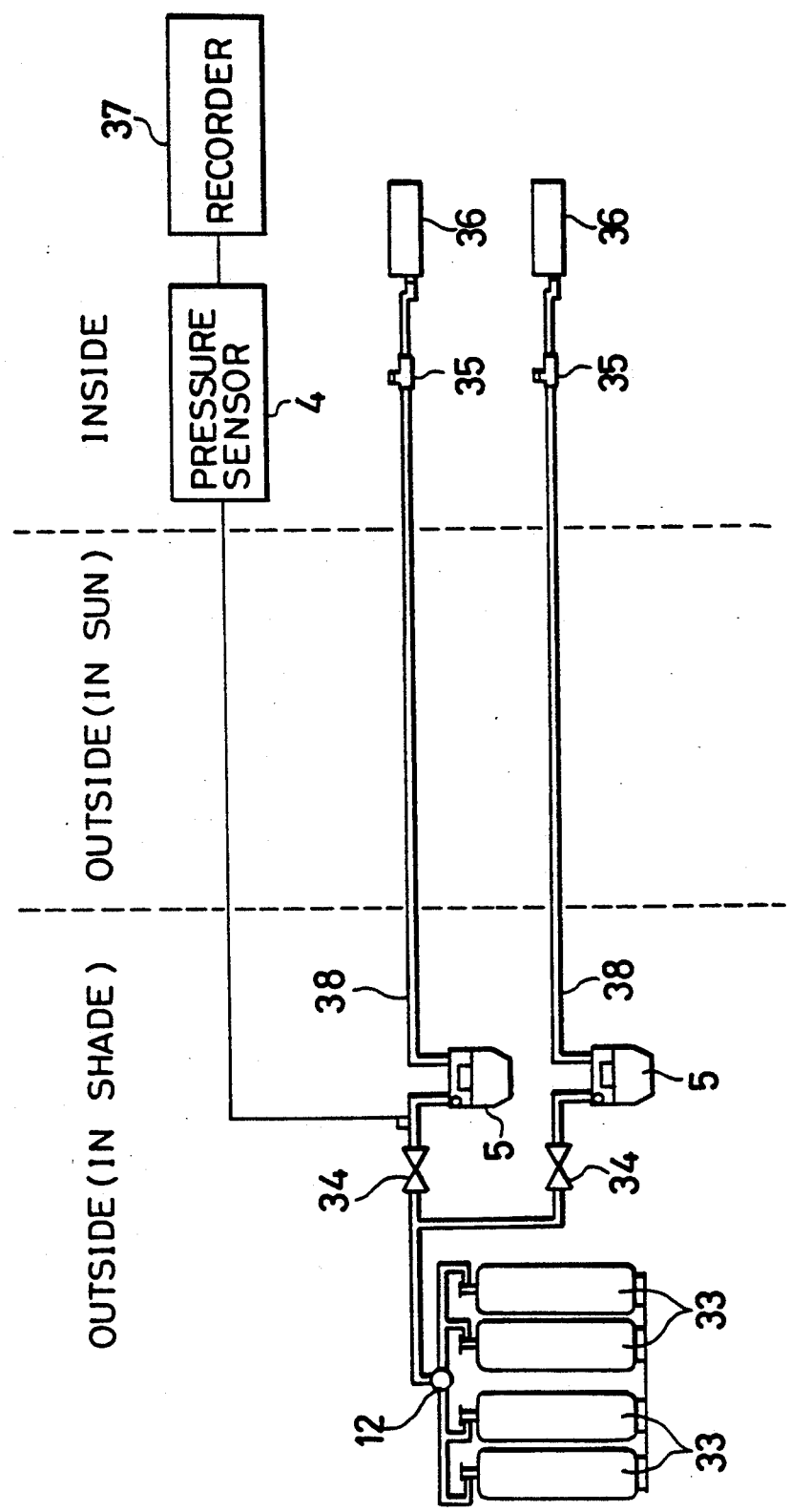
FIG. 6 is a schematic view of a gas supply system for supplying gas to two use points.

The tests were conducted on gas supply systems using a single gas cylinder (FIG. 4), using two gas cylinders (FIG. 5), and using four gas cylinders and serving two use points (FIG. 6).

Figure 4:
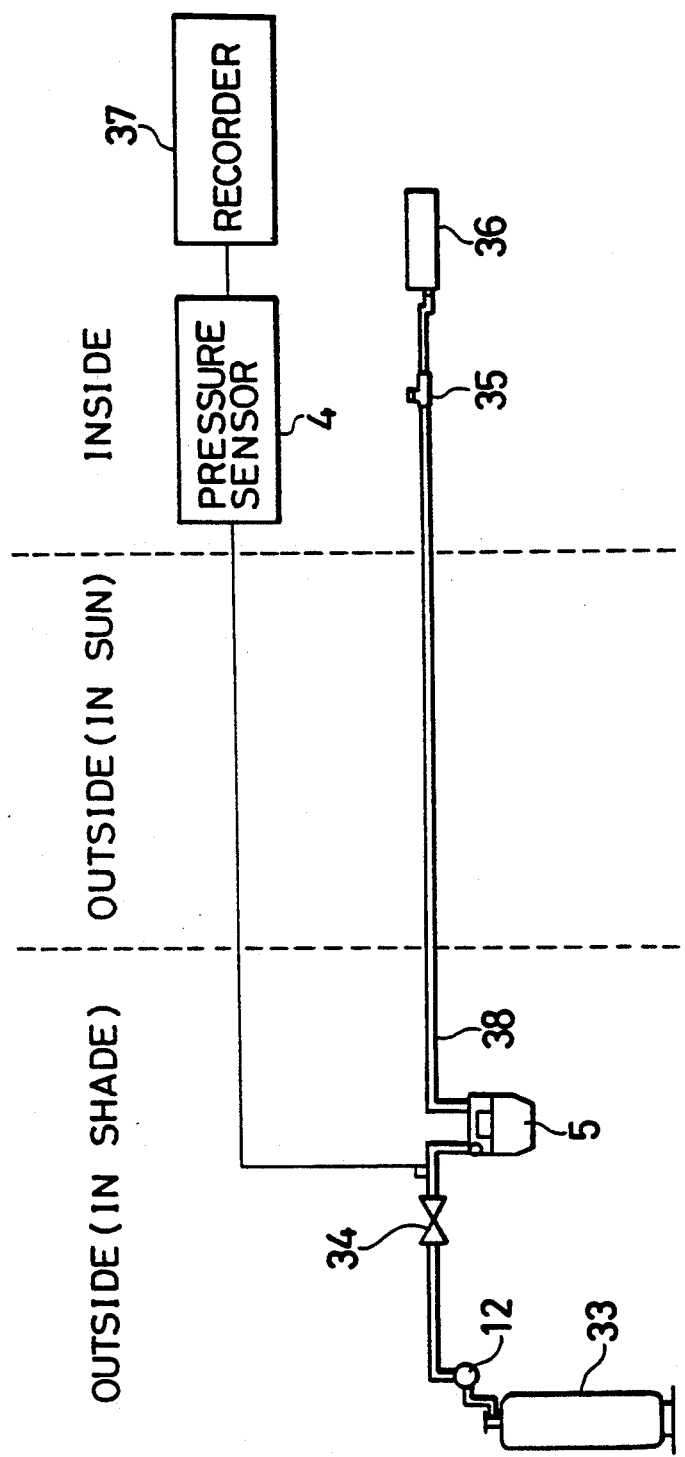
FIG. 4 is a schematic view of a gas supply system using a single gas cylinder.

As shown in FIG. 4, the gas flow passage 38 of the gas supply system using a single gas cylinder extended between a gas cylinder 33 and a gas burner 36 and was installed with a pressure regulator 12, a meter valve 34, a gas meter 5 and a cock 35 in the order mentioned. A pressure sensor 4 was connected with the gas flow passage 38 at a point between the meter valve 34 and the gas meter 5 and its output was sent to a recorder 37.

The gas supply system using two gas cylinders shown in FIG. 5 was the same as the single cylinder system of FIG. 4 except for the number of cylinders. As illustrated, a single pressure regulator 12 was used for both cylinders.

As shown in FIG. 6, in the gas supply system serving two use points the four cylinders were connected with a single pressure regulator 12, downstream of which the supply system branched into two gas flow passages 38 each installed with a meter valve 34, a gas meter 5 and a cock 35 connected with a gas burner 36. A pressure sensor 4 was connected with one of the gas flow passages 38 at a point between the meter valve 34 and the gas meter 5 and its output was sent to the recorder 37.

In each of the gas supply systems, the length of the gas flow passage between the gas meter 5 and the cock 35 was about 10 m (inner pipe diameter: 16.7 mm) and about 5 m of this length was laid so that the sun would hit it. The pressure regulator 12 was adjusted so that the gas pressure in the gas flow passage would be about 280 mm $H_2O$. (Pressures below −200 mm $H_2O$ could not be measured.)

Figure 7:
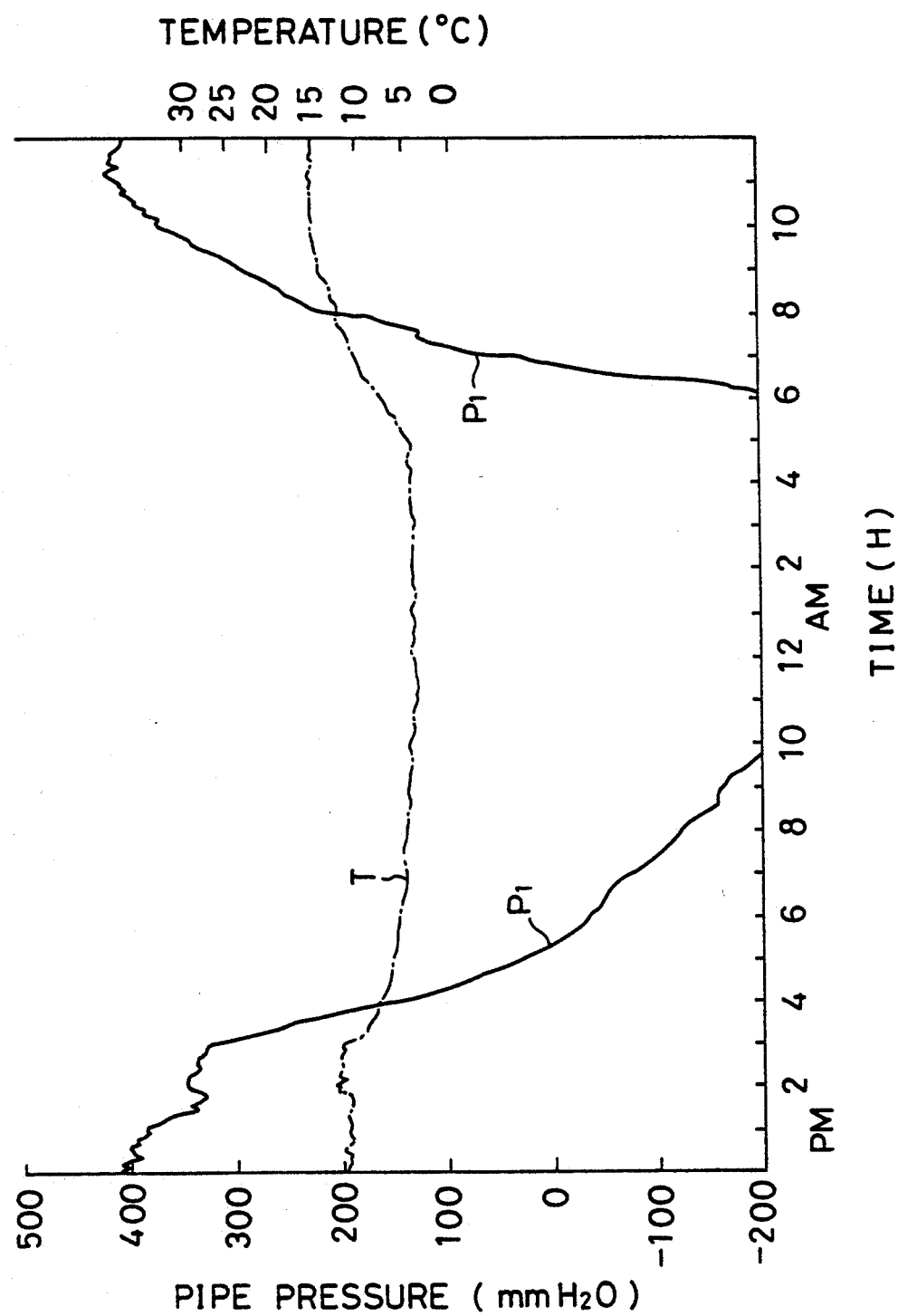
FIG. 7 is a graph showing the measured fluctuation in gas pipe pressure over one day in a gas supply system using a single gas cylinder, and also showing the fluctuation in outdoor temperature for the same day.

FIG. 7 shows the pressure fluctuation in the gas flow passage of the single cylinder system over a one-day period in a no gas supply state in which the valve of the gas cylinder 33 and the gas burner 36 were closed and the meter valve 34 and the cock 35 were open. In this graph, the curve T indicates outdoor temperature and the curve $P_1$ the gas pressure in the gas flow passage.

From this graph it can be seen that the gas pressure in the flow path began to fall sharply together with the start of the decline in temperature from around 4 pm, and then began to rise sharply with the rise in temperature from around 6 am. It will also be noted that a difference of about 10° C. between the day's maximum and minimum temperatures produced a pressure fluctuation of over 600 mm $H_2O$, which is in good agreement with the calculation done earlier.

Figure 8:
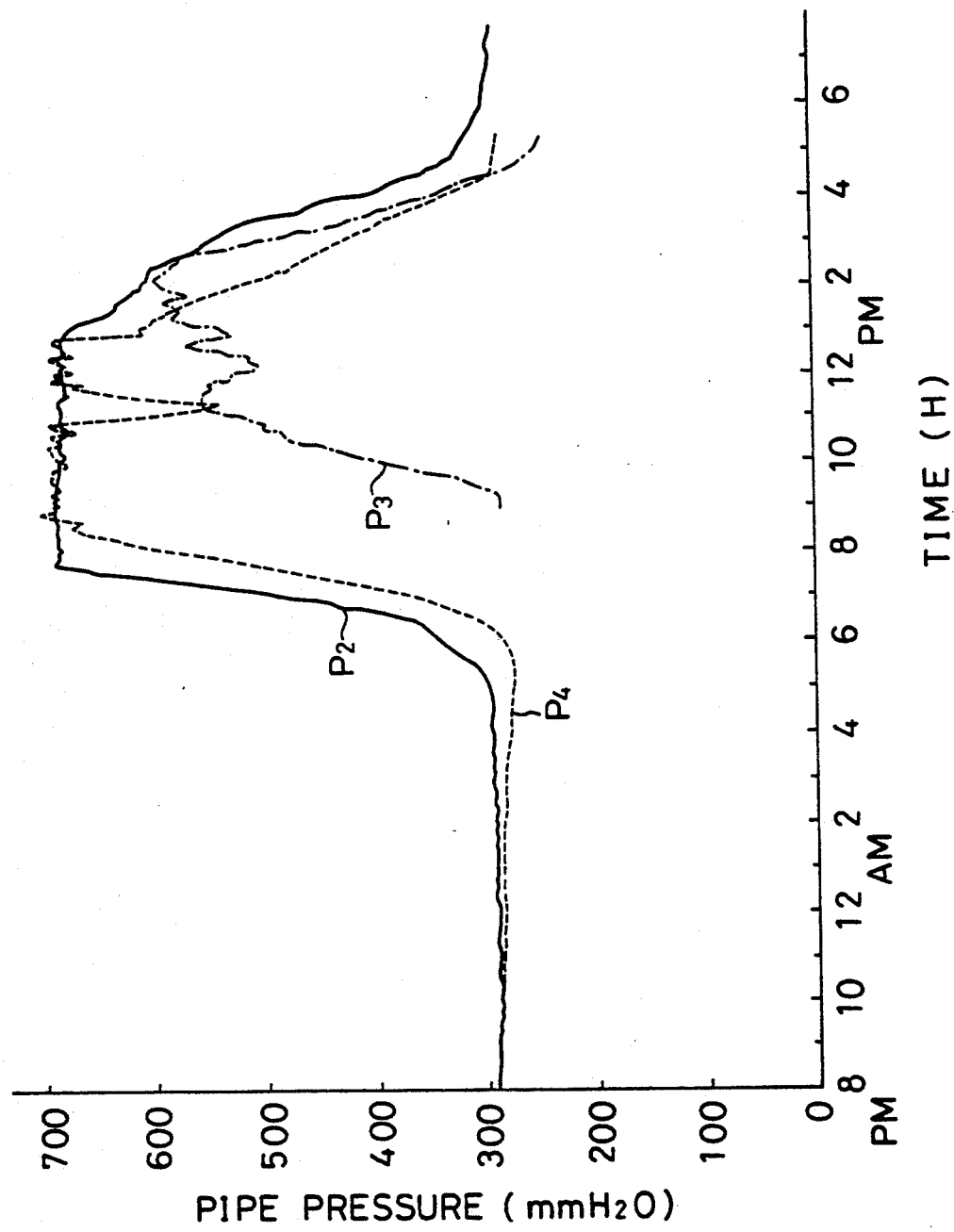
FIG. 8 is a graph showing the measured fluctuation in gas pipe pressure over one day in a gas supply system using a single gas cylinder.

In the graph of FIG. 8, which also relates to the single cylinder gas supply system, the curve $P_2$ shows the fluctuation in gas pressure in the gas flow passage 38 in the case where the valve of the gas cylinder 33, the meter valve 34 and the cock 35 were open and the only the cock of the gas burner 36 was closed, curve $P_3$ shows the gas pressure fluctuation in the case where the valve of the gas cylinder 33 and the meter valve 34 were open and the cock 35 and the cock of the gas burner 36 were closed, and curve $P_4$ shows the gas pressure fluctuation in the case where the cock of the gas cylinder 33, the meter valve 34, the cock 35 and the cock of the gas burner 36 were all closed. Although the foregoing tests were conducted on different days, all were made in the same season.

As can be seen from this graph, in the case where only the cock of the gas burner was closed and the case where the meter valve 34 and the cock 35 were also closed, the gas pressure in the gas flow passage stayed at around 280 mm $H_2O$ from sundown to around 6 am, whereafter it rose until around 8 am and then substantially leveled off until around 1 pm, from when it fell until returning to about 2800 $H_2O$ at around 6 pm. In the case where only the cock 35 and the cock of the burner were closed, on the other hand, the pipe pressure stayed at about 280 mm $H_2O$ until around 9 am, rose between 9 am and 11 am, fluctuated slightly while maintaining a fairly constant pressure until about 2 pm and then fell until returning to 280 mm $H_2O$ at about 6 pm.

Figure 9:
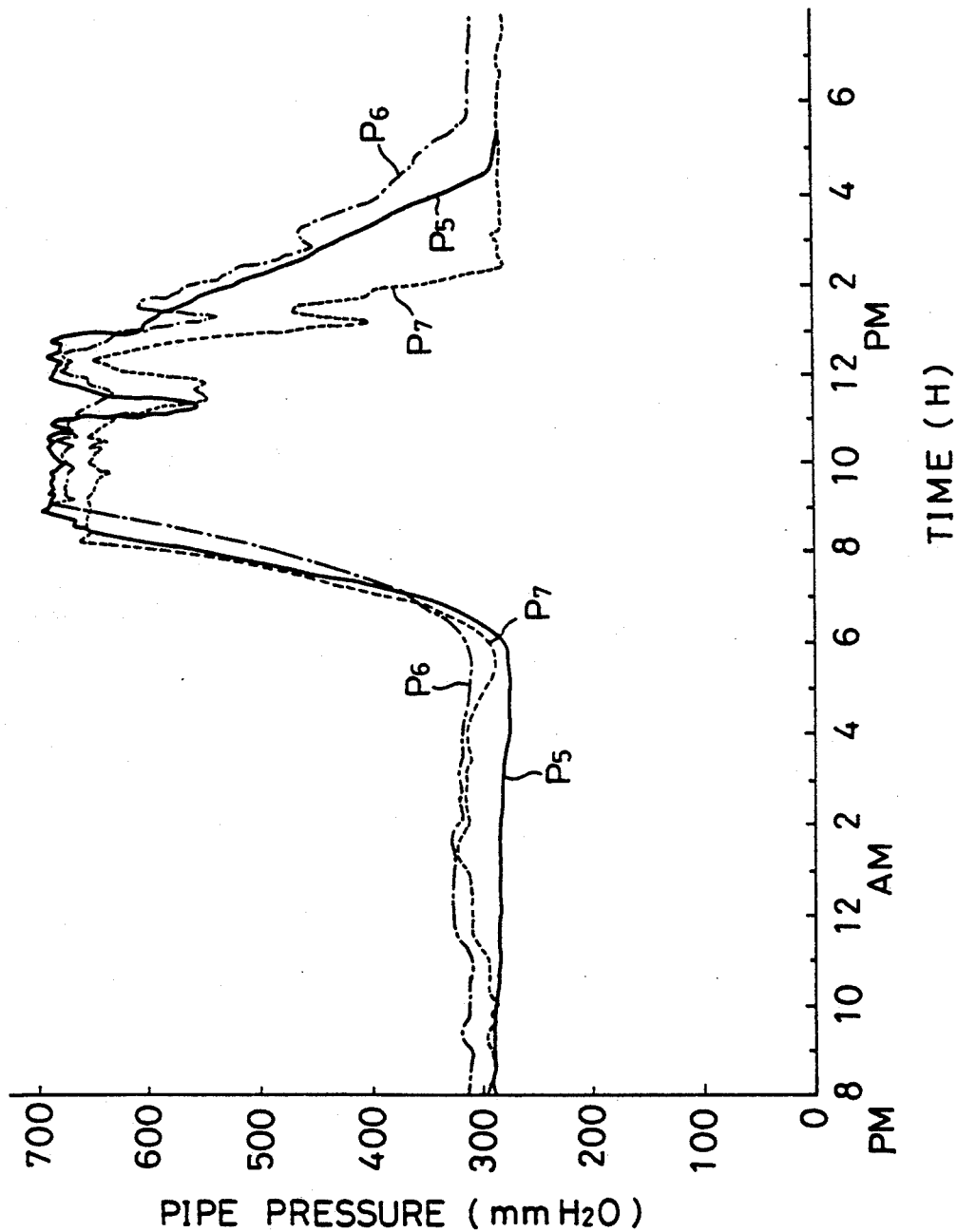
FIG. 9 is a graph showing the measured fluctuation in gas pipe pressure over one day in each gas supply path of a gas supply system serving a plurality of use points, separately for the case of using a single gas cylinder and of using a plurality of gas cylinders.

FIG. 9 is a graph showing the fluctuation in the pressure in the gas flow passage over the course of one day in the case of the single cylinder gas supply system ($P_5$), the two-cylinder gas supply system ($P_6$) and the two-user gas supply system ($P_7$), in the case where the cock(s) of the gas cylinder(s) 33, the meter valve(s) 34 and the cock(s) 35 were open and the cock(s) of the gas burner(s) 36 was (were) closed. In each system, the pressure in the gas flow passage 38 stayed at around 300 mm $H_2O$ through the night, rose between about 6 am and about 8 am, stayed approximately constant between about 8 am and 1 pm and then fell from about 1 pm until returning to around 300 mm $H_2O$ at about 6 pm.

This graph shows that when there is no gas flow in the gas flow passage of a gas supply system, the gas pressure in the gas flow passage rises and falls with changes in the outdoor temperature (gas temperature) in a pattern that includes a sharp rise from around 6 am (sunrise) to around 8 am.

Figure 10:
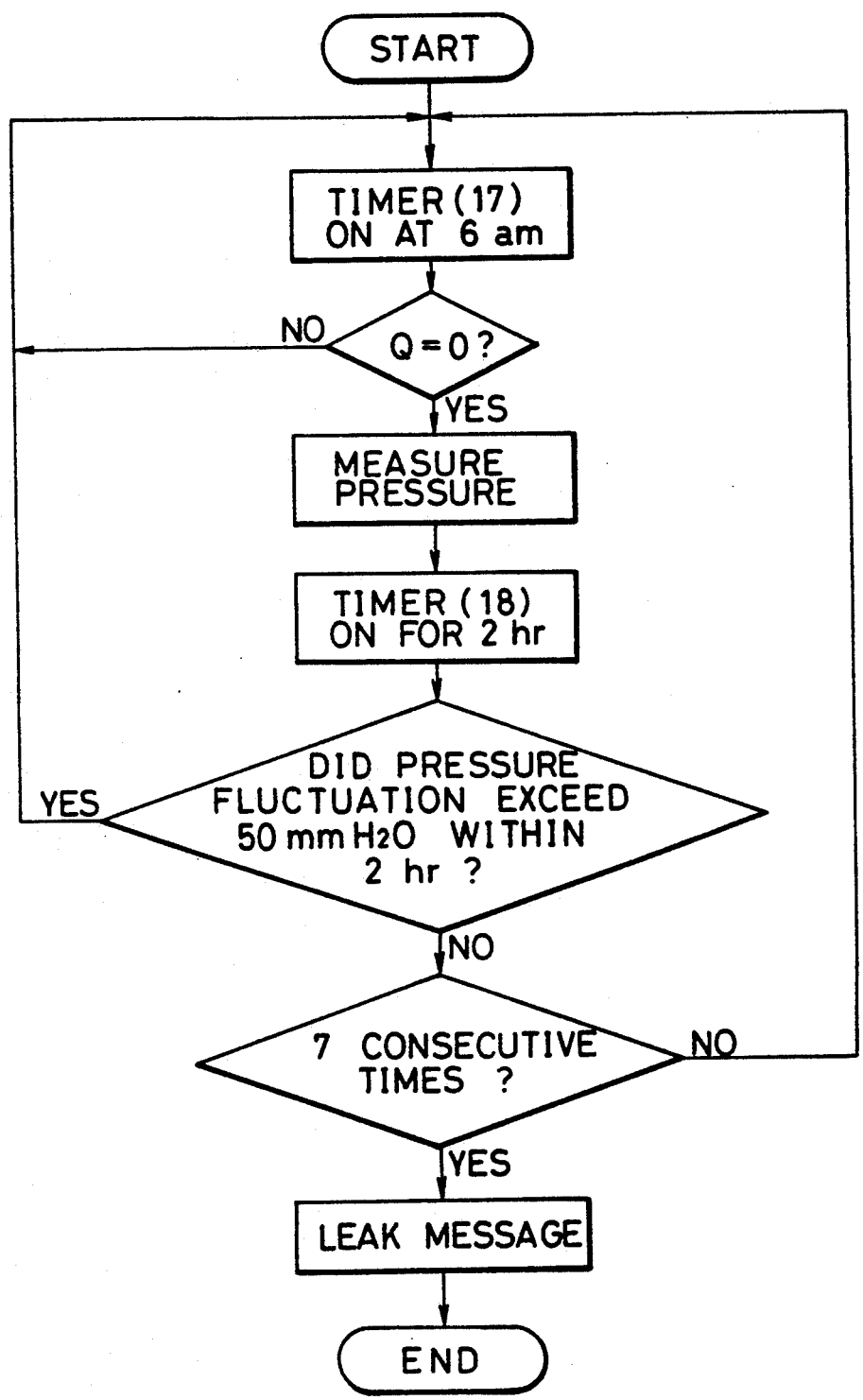
FIG. 10 is a flow chart of the procedure used for discriminating gas leaks in the present invention.

The process for discriminating gas leaks according to the invention will now be explained with reference to the flow chart of FIG. 10.

The procedure begins at the time (e.g. 6 am) set in the first timer 17 of the microcomputer 7 as the monitoring start time.

The flow signal discriminator 13 then discriminates whether or not a flow signal is being produced and if the flow Q is 0, the pressure signal discriminator 14 monitors the fluctuation in the pressure signal over the time period set in the second timer 18 (e.g. over 2 hours starting from 6 am). The two-hour period between 6 and 8 am is chosen as the leak discrimination period because this is the period during which the pressure in the gas flow passage rises most markedly with the rise in outdoor temperature, as was ascertained through the tests described earlier.

The leak discriminator 15 then discriminates whether or not the pressure fluctuation over the course of the monitoring period is within a prescribed range of, say, 50 mm $H_2O$ or less. If the fluctuation exceeds the 50 mm $H_2O$ range, it can be assumed that gas is not leaking from the system and the foregoing discrimination procedures are repeated on the following day. On the other hand, if the fluctuation is not greater than 50 mm $H_2O$, since this means there is a possibility of a leak, the data stored in the memory 16 regarding the result of previous discriminations is checked as to whether there have been seven consecutive discriminations in which the pressure fluctuation was found to be not greater than 50 mm $H_2O$.

If it is found that there have been less than seven consecutive such discriminations, the results are considered to be within the range of measurement error. It is therefore decided that no gas leak has occurred and the foregoing discrimination procedures are repeated on the following day.

On the other hand, if it is found that the number of consecutive such discrimination is seven, it is judged that a gas leak has occured and a leak signal is sent to the display 9 for displaying a message to this effect. At the same time, a signal is sent to the shut-off valve 3 for stopping the flow of gas.

The reason for judging that a gas leak has occured only after it has been found that the pressure fluctuation does not exceed 50 mm $H_2O$ in seven consecutive discriminations (on seven consecutive days) is that the pattern of outdoor temperature change varies depending on the weather. Specifically, since the range of outdoor temperature fluctuation is less on cloudy and rainy days than on sunny days, the range of gas pressures fluctuation is also smaller. The gas leak detection system according to this embodiment therefore maintains the pressure fluctuations over the past week in memory and when it is found that the pressure fluctuation failed to exceed 50 mm $H_2O$ on seven consecutive days, displays a leak message and operates the shut-off valve to stop the gas flow.

It will be understood that the start time and duration of the discrimination procedures are not limited to that of the foregoing embodiment but can and should be adjusted for the locally, season and the like. Moreover the number of discrimination results stored to memory and used as the basis for judging whether or not a leak has occured does not necessarily have to be seven. It is alternatively possible to arrange the system to judge leak occurrence on the basis of a smaller number of discriminations (even on the basis of a single discrimination) or on the basis of eight or more discriminations).

As will be understood from the foregoing description, the gas leak detection system according to the invention is provided with the flow sensor and the pressure sensor installed upstream of the flow sensor. When the flow signal discrimination means of the computing means determines that no flow signal is being produced, the leak discrimination means compares the pressure fluctuation discriminated by the pressure signal discrimination means with a prescribed pressure fluctuation value and if it finds that the pressure fluctuation value falls within the prescribed range, it produces a leak signal.

Therefore even when used in conjunction with a gas supply system at a hospital, school or the like in which the site of the gas storage facility is far from the site of the gas using equipment and the two sites are connected by an underground pipe and, moreover, the flow sensor is built into the gas meter at the gas using end or is fixed on a wall at the gas using end, the gas leak detection system according to the invention can reliably detect gas leaks occurring in the underground pipe and at other points upstream of the flow sensor.

Moreover, since the system according to the invention facilitates the judgment as to whether or not a leak has occured, it enables early discovery of gas leaks and, as such, contributes to the prevention of major accidents.

What is claimed is:

1. A system for detecting the leak of gas in a gas flow passage at a point upstream of a flow sensor, comprising:

a flow sensor for detecting the amount of gas flowing through said gas flow passage;

a flow signal generator for producing a flow signal representing the quantity of gas flow detected by said flow sensor;

a pressure sensor installed in said gas flow passage at a point upstream of said flow sensor for detecting the gas pressure in said gas flow passage;

a pressure signal generator for producing a pressure signal representing fluctuations in the pressure detected by said pressure sensor; and computing means electrically connected with said flow signal generator and said pressure signal generator, said computing means having a flow signal discrimination means for discriminating whether or not a flow signal is being produced by said flow signal generator, a pressure signal discrimination means for discriminating fluctuation in the pressure signal from said pressure signal generator, and a leak discrimination means which in response to a discrimination by said flow signal discrimination means that no flow signal is being produced compares the pressure fluctuation discriminated by said pressure signal discrimination means with a prescribed pressure fluctuation range and produces a leak signal when the pressure fluctuation value falls within said prescribed range.

2. A gas leak detection system according to claim 1 further comprising a shut-off valve installed in the gas flow passage between the flow sensor and the pressure sensor, the shut-off valve being responsive to the leak signal for shutting off the gas flow passage.

3. A gas leak detection system according to claim 1 further comprising a display responsive to the leak signal for displaying an abnormal state message.

4. A gas leak detection system according to claim 1, further comprising a pressure regulator provided in said gas flow passage upstream of said pressure sensor for maintaining the pressure of gas constant and wherein said gas flow passage upstream of said flow sensor is for gas flowing between said pressure regulator and said flow sensor.

* * * * *